United States Patent [19]

Kukes et al.

[11] Patent Number: 4,802,972

[45] Date of Patent: Feb. 7, 1989

[54] HYDROFINING OF OILS

[75] Inventors: Simon G. Kukes, Naperville, Ill.; Jerald A. Howell, Lake Jackson, Tex.

[73] Assignee: Phillips Petroleum Company, Bartlesville, Okla.

[21] Appl. No.: 154,734

[22] Filed: Feb. 10, 1988

[51] Int. Cl.$^4$ ............................................. C10G 47/34
[52] U.S. Cl. ...................... 208/107; 208/112; 208/216 R; 208/251 H; 208/253; 208/254 H; 208/291
[58] Field of Search .................. 208/107, 112, 216 R, 208/251 H, 253, 254 H, 291

[56] References Cited

U.S. PATENT DOCUMENTS

| | | | |
|---|---|---|---|
| 2,502,441 | 4/1950 | Dodd et al. | 148/6.15 |
| 3,619,410 | 11/1971 | Gleim | 208/108 |
| 4,066,530 | 1/1978 | Aldridge et al. | 208/112 |
| 4,244,839 | 1/1981 | Aldridge et al. | 252/431 C |
| 4,348,270 | 9/1982 | Bearden, Jr. et al. | 208/9 |
| 4,357,229 | 11/1982 | Bearden, Jr. et al. | 208/10 |
| 4,435,522 | 3/1984 | Yoshii et al. | 502/319 |
| 4,467,049 | 8/1984 | Yoshii et al. | 502/317 |
| 4,483,762 | 11/1984 | Grosboll | 208/216 R |
| 4,557,821 | 12/1985 | Lopez et al. | 208/108 |
| 4,563,265 | 1/1986 | Yoshii et al. | 208/108 |
| 4,564,441 | 1/1986 | Kukes et al. | 208/216 R |
| 4,608,152 | 8/1986 | Howell et al. | 208/108 |
| 4,708,784 | 11/1987 | Howell et al. | 208/112 |

OTHER PUBLICATIONS

"Molybdenum Compounds" by D. Killeffer and A. Linz, Intriscience Publishers, 1957, p. 90.
"Chelating Agents and Metal Chelates" by F. Dwyer and D. Mellor, Academic Press, 1964, p. 106.

*Primary Examiner*—Patrick P. Garvin
*Assistant Examiner*—George R. Fourson
*Attorney, Agent, or Firm*—K. K. Brandes

[57] ABSTRACT

A hydrofining process (preferably hydrovisbreaking process) comprises contacting a substantially liquid hydrocarbon-containing feed stream, which contains Ramsbottom carbon residue and materials boiling in excess of about 1000° F. at atmospheric conditions, with a free hydrogen-containing gas and a catalyst composition comprising at least one catechol compound of molybdenum. Preferably the catechol compound of molybdenum is prepared by reaction of a compound comprising molybdenum and oxygen with a catechol compound under non-reducing conditions.

20 Claims, No Drawings

HYDROFINING OF OILS

BACKGROUND OF THE INVENTION

In one aspect, this invention relates to a process for hydrofining liquid hydrocarbon-containing feed streams so as to produce lower boiling hydrocarbons. In another aspect, this invention relates to the use of an organic molybdenum compound as catalyst composition in a hydrovisbreaking process so as to minimize coke formation.

It is well known to hydrofine liquid hydrocarbon-containing feed streams such as heavy oils, which contain undesirable metal and sulfur compounds as impurities and also considerable amounts of cokable materials (referred to as Ramsbottom carbon residue), so as to convert these feed streams to lower boiling materials (i.e., to hydrocrack these feed streams), and to remove at least a portion of metal impurities, sulfur impurities and cokable materials. A specific type of hydrofining process is heat-soaking, preferably with agitation, in the presence of hydrogen but preferably in the absence of a fixed hydrotreating catalyst bed, hereinafter referred to as hydrovisbreaking.

One of the operational problems of hydrofining, in particular hydrovisbreaking processes, is the formation of undesirably high amounts of coke, which represent losses in hydrocarbonaceous materials, cause operational problems, and may necessitate a costly separation step. Therefore, there is an ever present need to develop new oil hydrotreating processes utilizing efficient hydrofining agents designed to reduce coke formation.

SUMMARY OF THE INVENTION

It is an object of this invention to provide a process for hydrofining substantially liquid hydrocarbon-containing feed streams. It is another object of this invention to employ a novel molybdenum-containing hydrofining catalyst composition. It is a further object of this invention to provide a process for hydrovisbreaking heavy oils that contain Ramsbottom carbon residue. Other objects and advantages will be apparent from the detailed description and the appended claims.

In accordance with this invention, a hydrofining (preferably hydrovisbreaking) process comprises the step of contacting a substantially liquid hydrocarbon-containing feed stream (preferably a heavy oil), which contains Ramsbottom carbon residue (measured in accordance with ASTM method D524) and also materials boiling in excess of about 1000° F. under atmospheric pressure conditions, simultaneously with a free hydrogen-containing gas and a catalyst composition comprising at least one catechol compound of molybdenum, under such hydrofining (preferably hydrovisbreaking) conditions as to obtain at least one liquid hydrocarbon-containing product stream containing lower amounts of Ramsbottom carbon residue and lower amounts of materials boiling in excess of 1000° F. at atmospheric pressure than said feed stream.

Preferably, the catechol compound of molybdenum is prepared by reacting a compound comprising molybdenum and oxygen with a catechol compound (i.e., an aromatic ring compound containing C, H and at least 2 OH groups in adjacent position to one another, preferably 1,2-hydroxybenzene) under non-reducing conditions, preferably at a temperature in the range of from about 20° to about 200° C. for a time period sufficient to afford a desired degree of conversion of the reactants to the desired product (i.e., the catechol compound of Mo).

Preferably, the contacting of the hydrocarbon-containing feed stream with the hydrogen-containing gas and the catalyst composition is carried out as a hydrovisbreaking process by heating with agitation, in the substantial absence of a fixed hydrotreating catalyst bed.

DETAILED DESCRIPTION OF THE INVENTION

Any hydrocarbon-containing feed stream that is substantially liquid at the hydrofining conditions of the process of this invention and contains Ramsbottom carbon residue (determined according to ASTM D524) and heavies boiling above 1000° F. can be processed using the above-described catalyst composition in accordance with the present invention. Suitable hydrocarbon-containing feed streams include crude oils, liquid petroleum products, liquid coal pyrolyzates, liquid products from extraction and/or liquefaction of coal and/or lignite, liquid products from tar sands, shale oil, liquid products from shale oil and similar products. The present invention is particularly directed to heavy oil feed streams such as heavy full range crudes, heavy topped crudes (residua) and other heavy materials which are generally regarded as too heavy to be distilled and generally boil in excess of about 650° F. (under atmospheric pressure conditions). These materials will generally contain the highest concentrations of Ramsbottom carbon residue, metals (Ni, V), sulfur and nitrogen.

Preferably, the Ramsbottom carbon residue content of the hydrocarbon-containing feed stream exceeds about 1 weight-%, and more preferably is of about 2–30 weight-%. Preferably, the feed contains hydrocarbanaceous materials which boil in excess of about 1000° F. (at atmospheric pressure) in the range of about 1 to about 99 weight-%, more preferably about 20–80 weight-%.

Preferably, the hydrocarbon-containing feed steam also contains about 3–500 ppmw nickel (parts by weight of nickel per million parts by weight of feed), about 5–1000 ppmw vanadium, about 0.2–6 weight-% sulfur, and about 0.1–3 weight-% nitrogen. Preferably the API gravity, measured at 60° F., of the feed is less than about 30, more preferably is in the range of from about 2 to about 30.

The free hydrogen containing gas used in the hydrotreating process of this invention can be substantially pure hydrogen gas, or can be a mixture of hydrogen with other gases such as nitrogen, helium, methane, ethane, carbon monoxide or hydrogen sulfide. At present, substantially pure hydrogen gas is preferred.

The catalyst composition employed in the process of this invention can be prepared in any suitable manner and in any apparatus which affords the at least partial (preferably substantial) conversion of the reactants, i.e., (a) a molybdenum and oxygen containing compound and (b) a catechol compound, to the desired product, i.e., a catechol compound of molybdenum. Generally the weight ratio of reactant (a) to reactant (b) is in the range of from about 0.02:1 to about 5:1, preferably about 0.1:1 to about 1:1. Reducing agents, in particular carbon monoxide and free hydrogen, are preferably substantially absent during the catalyst preparation, so as to avoid reduction of Mo (preferably in the oxidation state of +6) to any lower valence state of Mo.

Suitable reaction conditions for the preparation of the catechol compound of Mo include a reaction temperature in the range of from about 20° to about 200° C. (preferably about 25°–150° C.) and a reaction time of from about 0.1 to about 100 minutes (preferably about 1–20 minutes). The reaction pressure during the catalyst preparation can be atmospheric (i.e., about 1 atm, presently preferred) or subatmospheric or superatmospheric. The two reactants (a) and (b) can be mixed and then heated to the desired reaction temperature, preferably with agitation (e.g., stirring). Or the compound of Mo can be added to the molten catechol compound. Or one or both reactants can be dissolved in a suitable solvent, preferably water, before they are mixed and can then be heated to the desired reaction temperature, preferably with agitation. Preferably, the solvent is at least partially (more preferably essentially completely) removed before the catechol compound of Mo is used in the hydrofining process of this invention. The molar ratio of Mo to catechol in the catechol compound of Mo generally is in the range of from about 0.2:1 to about 10:1, preferably from about 0.5:1 to about 3:1.

Any suitable catechol compound can be employed as reactant (b) in the preparation of the catalyst composition. Non-limiting examples of catechol compounds are: 1,2-dihydroxybenzene (catechol), 1,2,3-trihydroxybenzene, 3-methyl-1,2-dihydroxybenzene, 4-methyl-1,2-dihydroxybenzene, 3,4-dimethyl-1,2-dihydroxybenzene, 3,4,5,6-tetramethyl-1,2-dihydroxybenzene, 3-ethyl-1,2-dihydroxybenzene, 3-propyl-1,2-dihydroxybenzene, 4-ethyl-1,2-dihydroxybenzene, 3,4-diethyl-1,2-dihydroxybenzene, 1,2-dihydroxynaphthalene, 2,3-dihydroxynaphthalene and the like; preferably 1,2-dihydroxybenzene.

Any suitable molybdenum and oxygen containing compounds can be employed in the preparation of the catalyst composition. Non-limiting examples include molybdenum oxides (e.g., $MoO_3$), molybdenum blue, molybdic acids (e.g., $H_2MoO_4$), ammonium and alkali metal molybdates (e.g., $(NH_4)_2MoO_4$), ammonium and alkali metal dimolybdates, ammonium and alkali metal heptamolybdates, ammonium and alkaki metal isomolybdates, ammonium and alkali metal polymolybdates, and the like, and mixtures thereof. Preferably, the valence state of Mo in these compounds is +6. Presently more preferred is $(NH_4)_6Mo_7O_{24}$, most preferably as hydrate.

Any suitable amount of the catalyst composition can be employed in the hydrofining process of this invention. The amount of the catalyst composition to the hydrocarbon-containing feed will generally be such as to provide a concentration of about 1–2000, more preferably about 5–500, ppmw of molybdenum (calculated as element) in the feed stream. The catalyst composition can be added in solid form or in melted form or, preferably, dissolved in a suitable solvent, such as an alcohol, ketone, and the like.

The hydrofining process of this invention can be carried out by means of any suitable apparatus (reactor) whereby there is achieved an intimate contact of the hydrocarbon-containing feed stream, the free hydrogen-containing gas and the catalyst composition, under such hydrofining (preferably hydrovisbreaking) conditions as to produce a liquid hydrocarbon-containing product containing less Ramsbottom carbon residue and less heavies (boiling in excess of 1,000° F. at 1 atm) than the feed stream. Generally, this hydrovisbreaking process also reduces the amounts of nickel, vanadium, suliur and nitrogen compounds contained as impurities in the hydrocarbon-containing feed stream. The hydrofining process can be carried out as a continuous process or as a batch process. The terms "feed stream" and "product stream", as used herein, refer to continuous processes, as well as batch processes.

The hydrofining process of this invention is in no way limited to the use of any particular type of process or apparatus. In a continuous operation, it is preferred to premix the hydrocarbon-containing oil feed stream with the catalyst composition, e.g., in a vessel equipped with a mechanical stirrer, or in a static mixer, or by means of a recirculating pump. The catalyst composition can be applied as a solid or a melt or a solution in any suitable solvent (such as a liquid hydrocarbon or ketone or alcohol or water or mixtures thereof) or as an emulsion of an aqueous solution in a heavy oil, or the like. A mixture of the feed stream and the catalyst composition can be passed concurrently with a stream of free hydrogen-containing gas into the bottom portion of a reactor, which is preferably equipped with heating means and also mechanical agitating or static mixing means so as to provide intimate contact of the feed stream, hydrogen gas and catalyst composition at an elevated temperature. The products generally exit through outlets located in the :op portion of the reactor. In a batch operation, the feed stream and the catalyst composition can also be premixed and charged to a reactor equipped with heating means and agitating a static mixing means. The reactor is then generally pressured with hydrogen gas. However, it is within the scope oi this invention to introduce hydrocarbon-containing feed stream hydrogen containing gas and catalyst composition simultaneously, or sequentially in any order, to the reactor.

It is within the scope of this invention to have solid materials present, either umpromoted refractory oxides or phosphates (e.g., $Al_2O_3$, $SiO_2$, $AlPO_4$ and the like) or promoted hydrotreating catalysts (e.g., $Ni/Mo/Al_2O_3$, $Co/Mo/Al_2O_3$ and the like). However, it is presently preferred to substantially exclude such solid materials (either as fixed catalyst bed or as dispersed materials) during the hydrofining process of this invention in order to minimize operational problems, such as clogging of catalyst bed and of exit lines.

Any suitable hydrofining (reaction) time in the hydrofining process of this invention can be utilized. In general, the reaction time (i.e., the time oi contact between hydrocarbon-containing feed stream, hydrogen gas and catalyst composition under hydrofining conditions) will range from about 0.01 hours to about 20 hours. Preferably, the hydrofining (reaction) time will range from about 0.1 to about 5 hours and more preferably from about 0.25 to about 3 hours. Thus, for a continuous process, the flow rate of the hydrocarbon-containing feed stream should be such that the time required for the passage of the mixture through the reactor (residence time) will preferably be in the range of about 0.1 to about 5 hours and more preferably about 0.25 to about 3 hours. For a batch process, the hydrocarbon-containing feed stream will preferably remain in the reactor for a time in the range of about 0.1 hours to about 5 hours and more preferably from about 0.25 hours to about 3 hours.

The hydrofining process of this invention can be carried out at any suitable temperature. The temperature will generally be in the range of about 250° C. to about 550° C. and will preferably be in the range of about 380° to about 480° C. Higher temperatures do improve the removal of impurities, but such temperatures may have adverse effects on coke formation. Also, economic consideration will have to be taken into consideration in the selection of the reaction temperature.

Any suitable pressure can be utilized in the hydrofining process of this invention. The reaction pressure will generally be in the range of about atmospheric (0 psig) to about 10,000 psig. Preferably, the pressure will be in the range of about 500 to about 3,000 psig. Higher hydrogen pressures tend to reduce coke formation but operation at high pressure may have adverse economic consequences.

Any suitable quantity of hydrogen can be used in the hydrofining process of this invention. The quantity of added hydrogen used to contact the hydrocarbon-containing feed will generally be in the range of about 100 to about 20,000 standard cubic feed $H_2$ per barrel (SCFB) of the hydrocarbon-containing feed stream, and will more preferably be in the range of about 500 to about 5,000 SCFB.

The gaseous, liquid and solid products of the hydrofining (preferably hydrovisbreaking) process of this invention can be withdrawn from the contacting zone (reactor) and be separated from each other by any conventional separating means. Also, the fractionation of the liquid hydrocarbon-containing product stream having reduced Ramsbottom carbon residue into fractions boiling within different temperature ranges can be carried out by any conventional distillation means, either under atmospheric or vacuum conditions.

At least a portion of the liquid hydrocarbon-containing effluent rom the hydrofining reactor can first be treated in at least one additional hydrotreating process, more preferably carried out in a fixed bed reactor containing a suitable solid hydrotreating catalysts (such as $Co/Mo/Al_2O_3$, $Ni/Mo/Al_2O_3$ and the like) so as to reduce the amounts of remaining impurities (Ni, V, S, N, coke precursors), and thereafter in a catalytic cracking process (e.g., a FCC process employing clay- or zeolite-containing catalysts) under such conditions so as to produce gasoline, distillate fuels and other useful products. It is, however, possible to catalyticall crack (e.g., in the presence of zeolite or clay catalysts) at least a portion of the effluent from the hydrofining process of this invention without such an additional prior hydrotreating process employing solid hydrotreating catalysts.

The following examples are presented in further illustration of the invention.

EXAMPLE I

In this example the experimental setup for batch-type hydrovisbreaking oi heavy oils is described. About 100 grams of a topped (650° F.+) heavy crude (containing about 16 weight-% Ramsbottom carbon residue, about 4 weight-% S, about 450 ppm (V+Ni), and a 1000° F.+ fraction of about 64 weight-%) plus appropriate amounts oi various molybdenum containing catalyst compositions were added to a 300 cc stirred autoclave (Autoclave Engineers, Inc., Erie, Pa.), which was preheated to about 200° F. The unit was sealed, alternately pressured with $H_2$ and vented so as to eliminate air, and finally pressured with $H_2$ to the desired starting pressure (about 1400 psig). Stirring at about 1000 r.p.m. and rapid heating up to the test temperature about 800° F. was carried out. During the test run, hydrogen gas was added so as to maintain a constant pressure of about 2000 psig at the final test temperature.

After heating at about 800° F. for about 60 minutes, the unit was cooled as quickly as possible, depressured and opened. The liquid product was collected and analyzed. Primarily, the amount of dispersed coke particles (collected by filtration through a 0.45 μm membrane filter and weighing) and the amount of the fraction boiling above 1000° F. was determined.

EXAMPLE II

This example illustrates the preparation of the molybdenum-containing hydrovisbreaking catalyst composition of this invention.

Invention Catalyst A1 was prepared as follows. 5 grams of 1,2-dihydroxybenzene (generally referred to as catechol) was dissolved in 100 cc of distilled water with stirring. 0.5 gram of an ammonium molybdate of the formula $(NH_4)_6Mo_7O_2.4H_2O$ was added to the solution, which was then heated and stirred (in air at atmospheric conditions) until again a clear solution was obtained. This solution was then heated under vacuum conditions until the water contained therein had evaporated. The solid residue, primarily a catechol compound of Mo, was dissolved in acetone, the acetone solution was filtered, and the acetone solvent was allowed to evaporate.

Invention Catalyst A2 was prepared by first melting 15 grams of catechol at about 240° F. with stirring and then adding 3 grams of ammonium molybdate to the melt. After heating the melt for about 5 minutes at about 240° F. (in air, at atmospheric pressure), the molten mixture (which had turned black) was allowed to cool and was ground to a powder.

Control Catalyst B was Molyvan ® L, a mixture of about 80 weight-% of a sulfided molybdenum(V) dithiophosphate of the formula $Mo_2S_2O_2[PS_2(OR)_2]$ wherein R is the 2-ethylhexyl group, and about 20 weight-% of an aromatic oil (see above); marketed by R. T. Vanderbilt Company; Norwalk, Conn.

EXAMPLE III

This example illustrates the results of hydrovisbreaking tests in accordance with the procedure outlined in Example I employing the catalyst compositions described in Example II. Test results are summarized in Table I.

TABLE I

|  | Run 1 (Invention) | Run 2 (Control) | Run 3 (Control) |
|---|---|---|---|
| Catalyst | A2[1] | None | B |
| ppm Mo Added | 43 | 0 | 55 |
| Coke Formed (Wt % of Oil Feed) | 2.9 | 10.0 | 3.0 |
| Wt % Conversion of 1000 F.+ Heavies | 43 | 63 | 45 |
| ppm (Ni + V) in Product | 256 | 114 | 225 |

[1]added as solution in cyclohexanol

Test results in Table 1 clearly show that a substantial reduction in coke formation was achieved by the addition of 43 ppm Mo as catechol compound of Mo (compare Run 1 with Run 2). A comparison of Run 1 and Run 3 shows that the catechol compound of Mo (Catalyst A2) was more effective than control Catalyst B (Mo dithiophosphate): only 43 ppm Mo in Catalyst A2 was needed to achieve about the same degree of reduction in coke formation and conversion of heavies (1000 F+) as 55 ppm Mo in control Catalyst B.

Reasonable variations, modifications and adaptations for various usages and conditions can be made within the scope of the disclosure and the appended claims, without departing from the scope of this invention.

We claim:

1. A hydrofining process comprising the step of contacting a substantially liquid hydrocarbon-containing feed stream, which contains Ramsbottom carbon residue and also materials boiling in excess of about 1000° F. under atmospheric pressure conditions, with a free hydrogen-containing gas and a catalyst composition comprising at least one catechol compound of molybdenum, in the substantial absence of solid material, and under such hydrofining conditions as to obtain at least one liquid hydrocarbon-containing product stream containing lower amounts of Ramsbottom carbon residue and lower amounts of said materials boiling in excess of about 1000° F. than said hydrocarbon-containing feed stream;

wherein said at least one catechol compound of molybdenum has been prepared by reacting, under non-reducing conditions, (a) at least one compound comprising molybdenum and oxygen with (b) an aromatic compound containing an aromatic ring of carbon and hydrogen and at least two OH groups in positions adjacent to one another.

2. A process in accordance with claim 1, wherein said reacting is carried out in the substantial absence of carbon monoxide and free hydrogen.

3. A process in accordance with claim 1, wherein said reacting is carried out at a weight ratio of said compound comprising molybdenum and oxygen to said aromatic compound in the range of from about 0.02:1 to about 5:1.

4. A process in accordance with claim 1, wherein the molar ratio of molybdenum to said aromatic compound in said catechol compound of molybdenum is in the range of from about 0.2:1 to about 10:1.

5. A process in accordance with claim 1, wherein said compound comprising molybdenum and oxygen is $(NH_4)_6Mo_7O_{24}$.

6. A process in accordance with claim 1, wherein said aromatic compound is 1,2-dihydroxybenzene.

7. A process in accordance with claim 1, wherein said reacting is carried out at about 20°–200° C. for about 0.1–100 minutes.

8. A process in accordance with claim 1, wherein the amount of Ramsbottom carbon residue in said hydrocarbon-containing feed stream exceeds about 1 weight-%.

9. A process in accordance with claim 8, wherein said amount of Ramsbottom carbon residue in about 2–30 weight-%.

10. A process in accordance with claim 1, wherein the amount of said materials boiling in excess of about 1000° F. is about 1–99 weight-%.

11. A process in accordance with claim 1, wherein said hydrocarbon-containing feed stream contains about 3–500 ppmw nickel, about 5–1000 ppmw vanadium, about 0.2–6 weight-% sulfur and about 0.1–3 weight-% nitrogen.

12. A process in accordance with claim 1, wherein said hydrofining process is carried out by heating with agitation in the substantial absence of a fixed hydrotreating catalyst bed.

13. A process in accordance with claim 1, wherein said hydrofining conditions comprise hydrogen addition in the range of from about 100 to about 20,000 standard cubic feed of $H_2$ per barrel of hydrocarbon-containing feed, a hydrofining time in the range of from about 0.01 to about 20 hours, a temperature in the range of from about 250° to about 550° C., and a pressure in the range of from about 0 psig to about 10,000 psig.

14. A process in accordance with claim 1, wherein said hydrofining conditions comprise hydrogen addition in the range of from about 500 to about 5,000 standard cubic feet of $H_2$ per barrel of hydrocarbon-containing feed, a hydrofining time in the range of from about 0.1 to about 5 hours, a temperature in the range of from about 380° to about 480° C., and a pressure in the range of from about 500 psig to about 3,000 psig.

15. A process in accordance with claim 1 wherein the amount of said catalyst composition is such that the molybdenum concentration during said contacting is about 1–2,000 ppmw Mo in said hydrocarbon-containing ieed stream.

16. A process in accordance with claim 15, wherein said amount of said catalyst composition is such that the molybdenum concentration during said contacting is about 5–500 ppmw Mo in said hydrocarbon-containing feed stream.

17. A process in accordance with claim 1, wherein said hydrofining process is carried out by heating with agitation in the substantial absence of dispersed solid materials.

18. A process in accordance with claim 1, wherein said aromatic compound is selected from the group consisting of 1,2-dihydroxybenzene, 1,2,3-trihydroxybenzene, 3-methyl-1,2-dihydroxybenzene, 4-methyl-1,2-dihydroxybenzene, 3,4-dimethyl-1,2-dihydroxybenzene, 3,4,5,6-tetramethyl-1,2-dihydroxybenzene, 3-ethyl-1,2-dihydroxybenzene, 3-propyl-1,2-dihydroxybenzene, 4-ethyl-1,2-dihydroxybenzene, 3,4-diethyl-1,2-dihydroxybenzene, 1,2-dihydroxynaphthalene, and 2,3-dihydroxynapthalene.

19. A process in accordance with claim 1, wherein said at least one compound comprising molybdenum and oxygen is selected from the group consisting of molybdenum oxides, molybdic acids, ammonium molybdates, alkali metal molybdates, ammonium dimolybdates, alkali metal dimolybdates, ammonium heptamolydates, alkali metal heptamolybdates, ammonium isomolybdates, alkali metal isomolybadates, ammonium polymolybdates and alkali metal polymolybdates.

20. A process in accordance with claim 1, wherein in said at least one compound comprising molybdenum and oxygen the valence of molybdenum is +6.

* * * * *